United States Patent [19]

Zimmerman

[11] Patent Number: 4,781,466

[45] Date of Patent: Nov. 1, 1988

[54] METHOD AND APPARATUS FOR PRODUCING CONCRETE

[76] Inventor: Harold M. Zimmerman, R.D. #1, Wabash Rd., Ephrata, Pa. 17522

[21] Appl. No.: 866,273

[22] Filed: May 23, 1986

[51] Int. Cl.[4] .......................... B28C 5/14; B28C 7/06; B65G 65/06; B65G 67/08

[52] U.S. Cl. ........................................ 366/2; 198/313; 198/370; 198/734; 366/27; 366/37; 366/50; 414/343; 414/528

[58] Field of Search ........................ 366/16, 17, 19, 26, 366/33, 34, 37, 42, 50, 2, 6, 8; 198/313, 318, 370, 734, 735, 530, 366; 414/271, 272, 340, 343, 345, 346, 527, 528, 574, 573, 679, 269, 584, 376, 401, 373

[56] References Cited

U.S. PATENT DOCUMENTS

| | | | |
|---|---|---|---|
| 979,778 | 12/1910 | Malloy | 366/33 X |
| 2,776,741 | 1/1957 | Carrier, Jr. | 198/370 |
| 2,945,684 | 7/1960 | Soldini | 366/26 X |
| 2,948,519 | 8/1960 | Bradshaw, Jr. et al. | 366/16 |
| 3,067,858 | 12/1962 | Loosli | 198/313 X |
| 3,351,180 | 11/1967 | Herzog et al. | 198/370 |
| 3,498,486 | 3/1970 | Freeman, Jr. | 414/528 X |
| 3,750,802 | 8/1973 | Holland | 414/345 |
| 3,820,914 | 6/1974 | Zimmerman | 366/19 X |
| 3,828,919 | 8/1974 | Holtsclaw et al. | 198/370 X |
| 4,023,673 | 5/1977 | Hansen | 198/370 X |
| 4,051,948 | 10/1977 | Sackett, Sr. | 198/735 X |
| 4,199,054 | 4/1980 | Wirsbinski | 198/735 |
| 4,403,864 | 9/1983 | Stastny | 366/19 |
| 4,406,548 | 9/1983 | Haws | 366/37 X |
| 4,426,185 | 1/1984 | Wheeler et al. | 414/196 |
| 4,471,868 | 9/1984 | Buschbom et al. | 198/735 |
| 4,538,916 | 9/1985 | Zimmerman | 366/40 |

*Primary Examiner*—Harvey C. Hornsby
*Assistant Examiner*—Scott J. Haugland
*Attorney, Agent, or Firm*—Larry W. Miller

[57] ABSTRACT

A method and apparatus for continuously producing concrete at a job site is disclosed wherein the machine is provided with separate aggregate supply bins and a cement supply bin which are arranged in a generally linear fashion on a mobile frame and sized to hold at least a standard truck load of material. Delivery conveyors in operative communication with the supply bins convey material from the bins into a mixing auger where the materials are combined with water to produce concrete. A loading conveying is operable to receive different aggregates from delivery trucks and convey the aggregates to the respective supply bins while the machine continues forward movement along a path of travel. As a result, the concrete production machine can produce and discharge concrete in a continuous manner along its path of travel without stopping for frech supplies of materials.

9 Claims, 2 Drawing Sheets

METHOD AND APPARATUS FOR PRODUCING CONCRETE

BACKGROUND OF THE INVENTION

The present invention relates generally to mobile concrete producing machines and, more particularly, to improvements in such machines to permit a substantially continuous production and discharge of concrete along a path of travel while the mixer is in motion along the path of travel.

Mobile concrete mixers of the type seen in U.S. Pat. No. 4,538,916, issued to H. M. Zimmerman, on Sept. 3, 1985, carry discrete quantities of the various materials and components used to produce concrete. Such concrete mixing units have been marketed under the trademark ZIM-MIXER and includes hoppers containing sand, a course aggregate, cement and water. These materials are combined in a desirable proportion by a metering and conveying mechanism that delivers the materials into a mixing auger operable to combine the materials and produce the desired amount of concrete. Such concrete mixers are limited in the amount of concrete that can be produced on a continuous basis because of the limited supply of material carried within the supply bins.

Another type of concrete production system is commonly referred to as a ready-mix system in which the materials are combined at a stationary plant to produce concrete in predetermined desired quantities and discharge into a delivery truck which in turn transports the previously mixed concrete to the job site at which the concrete is dispensed. Similarly to the ZIM-MIXER system, the ready-mix system is limited in the amount of concrete that can be continuously dispensed at one time. A need has arisen to provide a machine for the production of concrete in which the machine can produce a substantially continuous supply of concrete along a path of travel without interruption. Such machines can be utilized to produce a continuous supply of concrete having uniform characteristics along the path of travel by depositing the concrete directly into forms on the ground. Furthermore, the dispensed concrete can be used as in highway or bridge concrete overlay situations for either construction or repairs, as well as at other similar job sites requiring large amounts of concrete with uniform characteristics.

SUMMARY OF THE INVENTION

It is an object of this invention to overcome the aforementioned disadvantages of the prior art by providing a concrete producing machine that can produce a continuous supply of concrete from materials delivered thereto while the machine is in motion.

It is another object of this invention to provide a mobile concrete production machine that is capable of providing a continuous flow of concrete therefrom along a path of travel.

It is a feature of this invention that the bins for storage of aggregates and cement on the mobile mixer are of a size to accept an entire truckload of each respective material before the supply of material in the bin is deleted.

It is an advantage of this invention the that materials are combined into a mixing auger to produce concrete substantially at the point upon which it is desired to place the concrete and at quantities desired for the specific job site.

It is yet another object of this invention to provide a mobile machine for producing concrete that is capable of receiving fresh supplies of raw materials while the machine is path of travel.

It is still another object of this invention to provide a method of substantially continuous production of concrete along a path of travel.

It is another feature of this invention that the mixing auger is pivotally connected at the rear of the concrete production machine to permit discharge of concrete therefrom transversely of the machine from side-to-side.

It is yet another feature of this invention that separate operator stations are provided for controlling the loading of raw materials and for locating the mixing auger for the selective discharging of concrete, respectively.

It is another advantage of this invention that the concrete placed along a path of travel will have substantially homogenous characteristics by reason that a single machine produces all the concrete deposited along the path of travel in a continuous manner.

It is a further object of this invention to provide a mobile concrete production machine for utilization in the production of a substantially continuous flow of concrete therefrom, which is durable in construction, inexpensive of manufacture, carefree of maintenance, facile in assemblage, and simple and effective in use.

It is yet a further object of this invention to provide a method of production of a substantially continuous flow of concrete along a path of travel that can be utilized in concrete overlays, as well as in primary installations.

These and other objects, features and advantages are accomplished according to the instant invention by providing a method and apparatus for continuously producing concrete at a job site wherein the machine is provided with separate aggregate supply bins and a cement supply bin which are arranged in a generally linear fashion on a mobile frame and sized to hold at least a standard truck load of material. Delivery conveyors in operative communication with the supply bins convey material from the bins into a mixing auger where the materials are combined with water to produce concrete. A loading conveying is operable to receive different aggregates from delivery trucks and convey the aggregates to the respective supply bins while the machine continues forward movement along a path of travel. As a result, the concrete production machine can produce and discharge concrete in a continuous manner along its path of travel without stopping for fresh supplies of materials.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
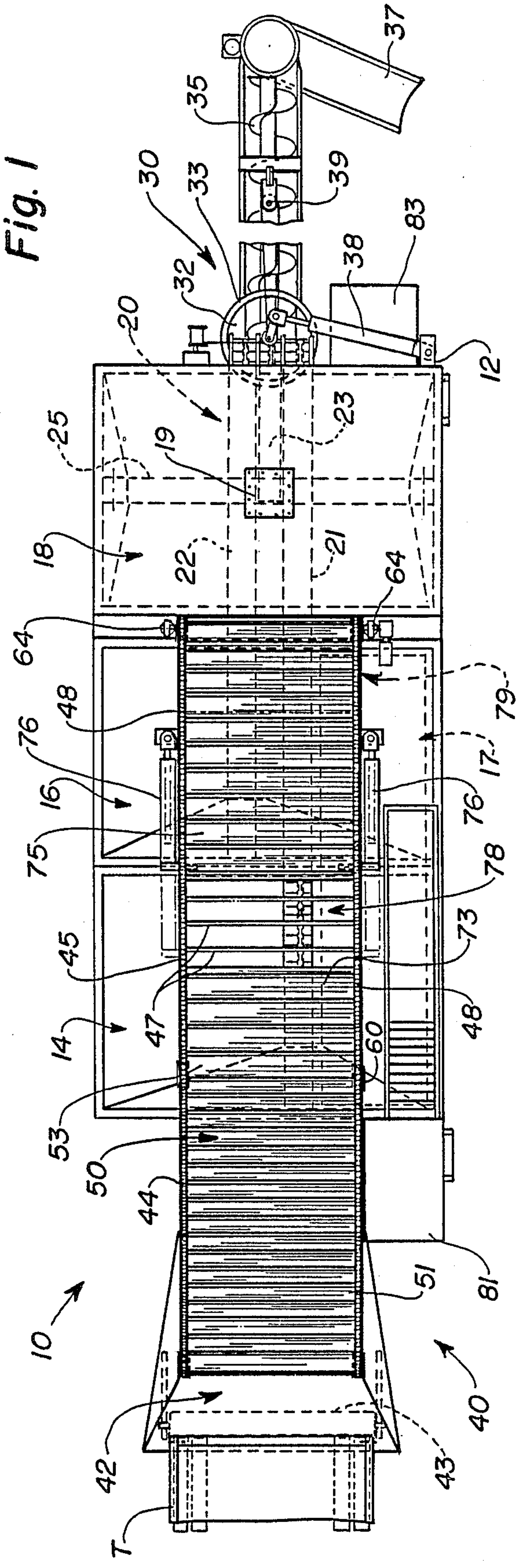
FIG. 1 is a top plan view of the mobile concrete production machine having a loading conveyor mounted thereon and a mixing auger extending rearwardly therefrom, portions of the mixing auger being broken away, and incorporating the principles of the instant invention.
Figure 2:
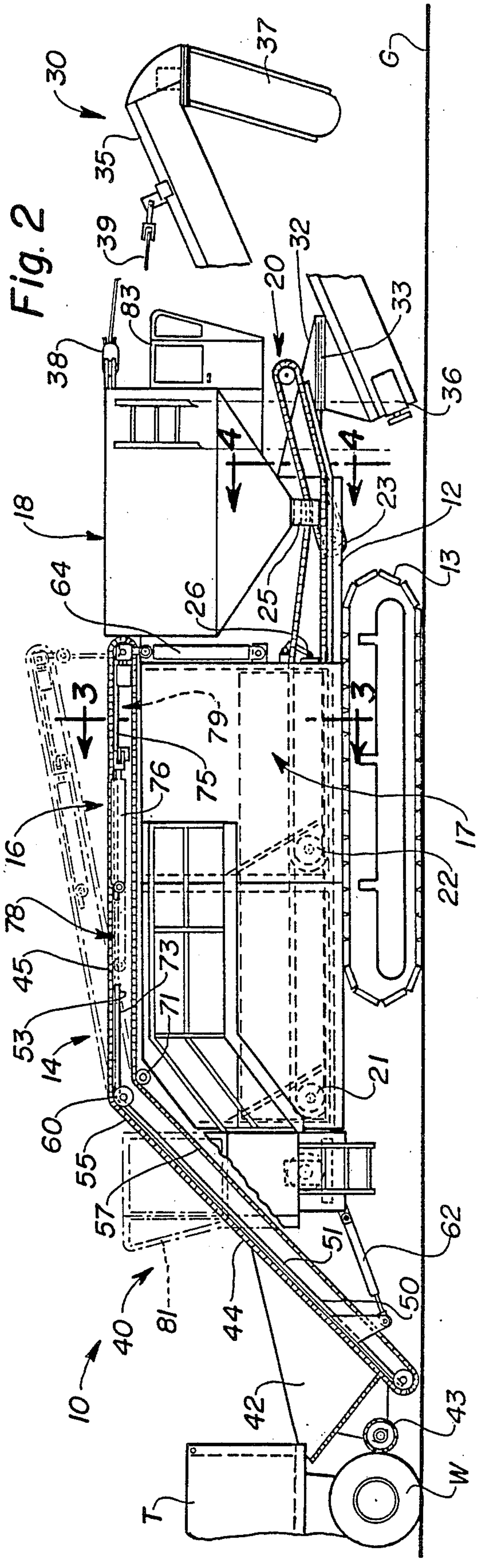
FIG. 2 is a left side elevational view of the mobile concrete production machine seen in FIG. 1 with a delivery truck being positioned adjacent the receiving hopper of the loading conveyor, portions of the mixing auger and the front operator's station being broken away to more clearly show the various components of the machine, the pivotal movement of the delivery portion of the loading conveyor being shown in phantom.

Referring now to the drawings and, more particularly, to FIGS. 1 and 2, top plan and left side elevational views of the mobile concrete production machine incorporating the principles of the instant invention can be seen. Any left and right references are used as a matter of convenience and are determined by standing at the rear of the machine from which the mixing auger extends, facing the forward end on which is mounted the receiving hopper of the loading conveyor, which is the normal direction of travel of the machine.

Figure 3:
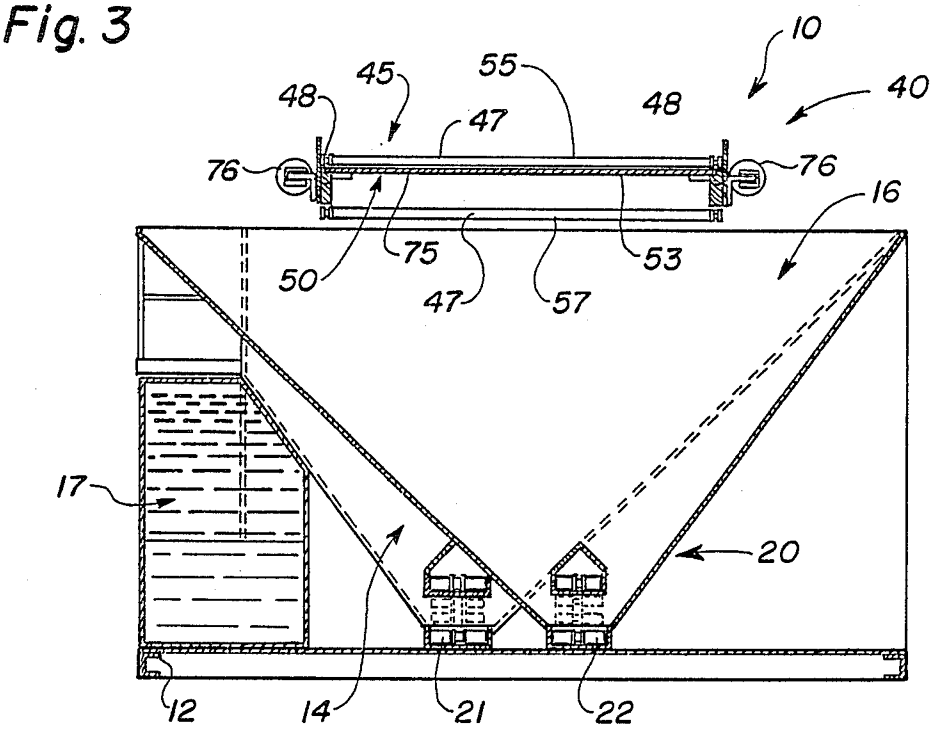
FIG. 3 is an enlarged partial cross-sectional view of the mobile concrete production machine taken along lines 3—3 of FIG. 2 through the rearwardmost aggregate supply bin, the delivery portion of the loading conveyor being shown in its lowermost position.
Figure 4:
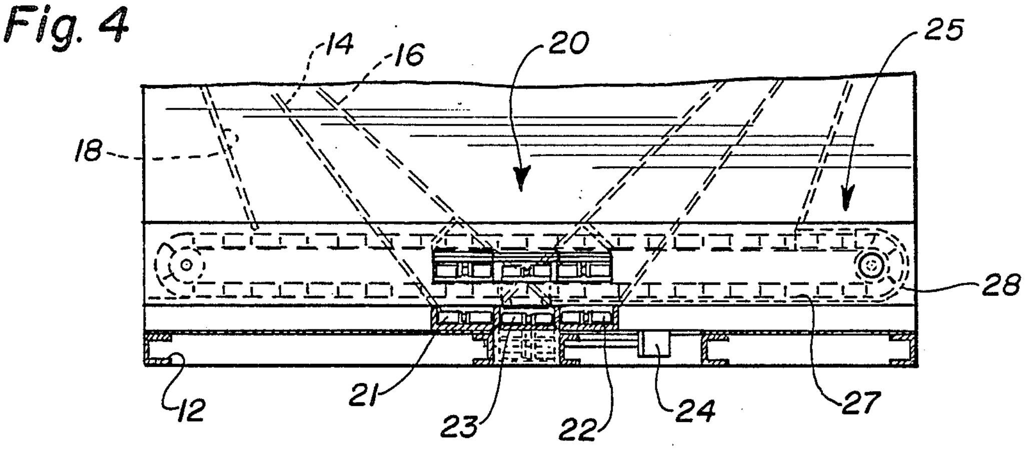
FIG. 4 is an enlarged partial cross-sectional view of the mobile concrete production machine taken along lines 4—4 of FIG. 2 to show the metering mechanism of the cement supply bin and the relative positions of the delivery conveyors bringing materials from the component supply bins to the hopper for the mixing auger.

The concrete production machine 10 is provided with a frame 12 mobilely supported over the ground G by a pair of conventional tracks 13, or alternatively a plurality of wheeled axles sufficient to support the weight of the machine 10, which permits the machine 10 to be mobilely moved over the ground G along a path of travel. The frame 12 supports above the tracks 13 a first aggregate supply bin 14, an adjacent second aggregate supply bin 16, a water tank 17, which is tucked underneath and adjacent to the aggregate supply bins 14,16 (as is better seen in FIG. 3), a cement supply bin 18 positioned rearwardly of the aggregate supply bins 14,16 and being equipped with an access mechanism 19 to permit a blowing of cement into the cement supply bin 18 in a conventional manner. These individual supply bins and/or tank contain discrete amounts of the component materials utilized in the production of concrete by the machine 10 and have sloped sides to facilitate the continuous flow of material therewithin to a delivery conveyor mechanism 20.

As best seen in FIGS. 1-4, the concrete production machine 10 is also provided with a delivery conveyor mechanism 20 which includes a first drag conveyor 21 in operable communication with the first aggregate supply bin 14 to convey aggregate therefrom, a second drag conveyor 22 in operable communication with the second aggregate supply bin 16 to convey aggregate therefrom and a third drag conveyor 23 cooperable with a metering mechanism 25 housed in the bottom of the cement bin 18 to convey discrete amounts of cement therefrom.

Each drag conveyor 21,22,23 is individually driven by a separate drive mechanism exemplarily shown by the hydraulic motor 24 operatively driving the third drag conveyor 23. As is described in greater detail in U.S. Pat. No. 4,538,916, issued to Harold M. Zimmerman on Sept. 3, 1985, the description of which is incorporated herein by reference, the metering mechanism 25 includes a transverse paddle conveyor 27 mounted within a housing 28 to prevent the cement from flowing from the supply bin 18 in an unmetered fashion into the third drag conveyor 23. By regulating the various speeds of the drag conveyors 21,22,23, as well as the paddle conveyor 27, and the volume of material carried between the respective blades of these conveyors, which can also be regulated in a conventional manner by the movable shuttle 26, the amounts of individual materials being conveyed thereby during any given increment of time can be determined and regulated as needed to produce concrete having the desired characteristics.

The delivery conveyor mechanism 20 discharges the materials therefrom into a mixing mechanism 30. The mixing mechanism 30 includes a hopper 32 for receiving the materials discharged from the drag conveyors 21,22,23 and is provided with an upper annular ring 33 to permit a pivoting of the mixing mechanism 30 for purposes to be described in greater detail below. The mixing mechanism 30 also includes a mixing auger 35 operably powered by a hydraulic motor 36 to mix the aggregates and cement received within the hopper 32 from the delivery conveyor mechanism 20 with water from the water tanks 17 through hoses (not shown) and with optional additive admixtures and chemicals in a conventional manner to produce concrete therefrom. Operation of the mixing mechanism 30 is described in greater detail in the aforementioned U.S. Pat. No. 4,538,916, and the related applications noted therein. The mixing auger 35 empties the concrete produced therein into a discharge chute 37 which in turn directs the concrete toward the ground G. The horizontal pivoted position of the mixing auger 35 and discharge chute 37 about the annular ring 35, as well as the vertical positioning of the mixing auger 35 is controlled and regulated through operation of a hydraulic cylinder 38 and a cable control mechanism 39 in a known manner to permit the discharge of concrete to the ground G in a side-to-side manner rearwardly of the machine 10.

As best seen in FIGS. 1 and 2, a loading conveyor extends forwardly of the concrete production machine and above the aggregate supply bins 14,16. The loading conveyor 40 is provided with a receiving hopper 42 appropriately positionable to receive a load of aggregate from an external source of supply, such as the truck T. The receiving hopper 42 is equipped with a roller 43 engageable with the wheels W of the truck T to facilitate a mobile engagement therewith in a manner described in greater detail below. The loading conveyor 40 is distinctly divided into an elevating portion 44 and a delivery portion 45 extending generally horizontally over the aggregate supply bins 14,16.

Figure 5:
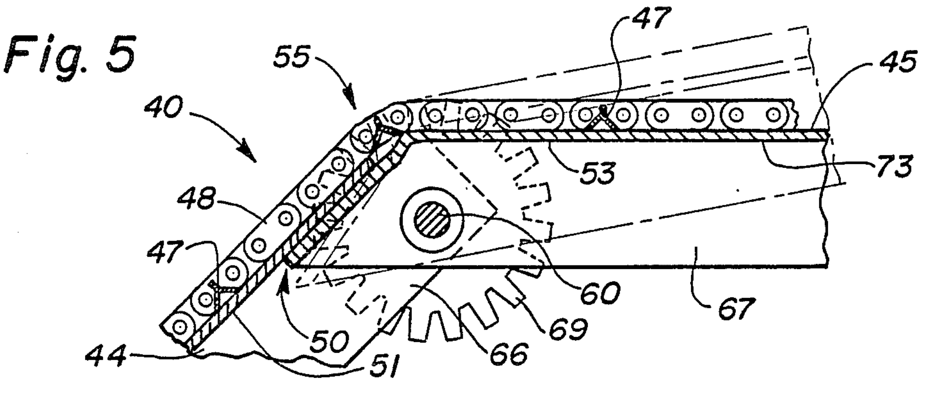
FIG. 5, is an enlarged partial cross-sectional view through the pivot shaft of the loading conveyor about which both the elevating portion and the delivery portion of the loading conveyor is pivotable to permit motion of the respective portions of the conveyor relative to the machine.

Referring also to the view of FIG. 5, it can be seen that the loading conveyor 40 is of a chain and slat construction with a plurality of transversely extending slats 47 extending between transversely spaced endless chains 48. The loading conveyor 40 is provided with a floor member 50 which is divided into a forward member 51 corresponding to the elevating portion 44 of the loading conveyor 40 and a rearward member 53 corresponding to the delivery portion 45 of the conveyor 40. The overlapping of the forward elevating flour member 51 and the rearward delivery floor member 53, which permits a continuous integrity of the floor member 50 whenever the respective portions 44,45 of the loading conveyor 40 are pivotally moved as described in greater detail below, is best seen in FIG. 5. In operation, the transverse slats 47, which can be oriented as shown in the drawings or in an orientation rotated about 90 degrees counterclockwise relative thereto so as to provide a cupped surface, engage material within the receiving hopper 42 and pass over the floor member 50 in operative association therewith to convey material from the receiving hopper 42 to the delivery portion 45. The endless loading conveyor 40 can also be divided into an upper delivery run 55 which passes over the floor member 50 in operative communication therewith and a lower return run 57 positioned beneath the floor member 50.

The receiving hopper 42 is integrally formed with the elevating portion 44 of the loading conveyor 40, which in turn is pivotally movable about the pivot shaft 60 forming a division between the elevating portion 44 and the delivery portion 45. The elevating portion 44 is pivotally movable in a generally vertical direction by the extensible hydraulic cylinder 62 interconnecting the frame 12 of the machine 10 and the elevating portion 44 of the conveyor 40. The pivotal movement of the elevating portion 44 permits the hopper 42 to follow changes in ground contours and to positionally match up with the truck T to facilitate the discharge and delivery of material from the truck T into the hopper 42. Similarly, the delivery portion 45 of the loading conveyor 40 is pivotally movable in a generally vertical direction by the hydraulic cylinder 64 which effects a pivotal rotation of the delivery portion 45 also about the pivot shaft 60. The vertical movement of the delivery portion 45 permits the piling of materials within the aggregate supply bins 14,16 to a level above the physical top of the supply bin 14,16 without becoming engaged with the delivery run 55 of the conveyor 40.

As best seen in FIG. 5, both the elevating portion 44 and the delivery portion 45 are provided with side frame members 66,67, respectively, which are journalled on the pivot shaft 60 to permit the pivotal movement of the portion 44,45. The pivot shaft 60 also carries a pair of sprockets 69 engaged with the endless chains 48 to permit a change in direction of the loading conveyor 40 from the elevating portion 44 onto the delivery portion 45. A tensioning sprocket 71, which may be sprinloaded and movable relative to the pivot shaft 60, engages the return run 57 of the conveyor 40 to take up the slack in the return run 57 while permitting the change in direction between the delivery portion 45 and the elevating portion 44 and permit the pivotal movement of the respective portions 44,45.

Referring now to FIGS. 1 and 2, the delivery portion floor member 53 is provided with a forward stationary section 73 and a linearly movable section 75 which is shiftable in a fore- and-aft direction by a pair of longitudinally extending hydraulic cylinders 76. When the movable section 75 is positioned in a rearward position, as best in the plan view of FIG. 1, an opening 78 is formed in the delivery portion floor member 53 over a rearward portion of the first aggregate supply bin 14. In this configuration, aggregate conveyed by the loading conveyor over the floor member 50 passes to the opening 78 and falls therethrough into the first aggregate supply bin 14. It should be noted by one skilled in the art that the aggregate passing through the opening 78 would pass through the return run 57 of the conveyor 40 and into the supply bin 14. When the level of aggregate discharged into the supply bin 14 is piled sufficiently high to reach the return run 57, which is moving in a forward direction, the return run 57 will be operable to engage the piled material and distribute it forwardly into the forward portions of the supply bin 14. In this manner, the supply of aggregate in the aggregate supply bin 14 can be replenished and substantially uniformly distributed throughout the supply bin 14.

The shifting movement of the hydraulic cylinder 76 is shown in FIGS. 1 and 2 in phantom and will affect a repositioning of the movable section 75 of the delivery portion floor member 53 in a forward position to close off the opening 78 over the supply bin 14 and open a discharge opening 79 along a rearward portion of the aggregate supply bin 16. In the same manner as described in the immediately preceding paragraph with respect to the filling of aggregate into the supply bin 14, the conveyor 40 conveys material from the hopper 42 along the floor member 50 from the elevating portion 44 to the delivery portion 45. The material is pushed by the transverse slats 47 over the stationary section 73 of the delivery portion floor member 53 and over the forwardly positioned movable section 75 to the discharge opening 79 over the aggregate supply bin 16.

Material passing through the opening 79 into the supply bin 16 must pass through the return run 57 of the conveyor 40 which is moving in a forward direction to permit a redistribution of material piled sufficient high to engage the return run 57 substantially uniformly throughout the supply bin 16. To further attain a uniform distribution of the aggregate loaded into either aggregate supply bin 14 or supply bin 16 and to further assure a substantial filling of the respective supply bin 14,16, the delivery portion 45 can be pivotally raised about the pivot shaft 60 by extension of the hydraulic cylinders 64. Such pivotal movement will permit the material to be piled somewhat higher within the respective supply bin 14,16 before being redistributed or during redistribution by the return run 57 of the conveyor 40.

As best seen in FIGS. 1 and 2, the concrete production machine 10 is formed in substantially a linear configuration. The supply bins 14,16 and 18 are located on the frame 12 in a linearly progressive fashion. Although the overall width of the machine 10 is limited to approximately 14 feet for transport over the highway system, the size of the respective bins 14,16,18 is sufficient to accept more than an entire truckload of aggregate and/or cement to permit a continuous operation of the machine in the production of concrete without running out of any of the component materials. The two aggregate supply bins 14,16 permit a storage of different aggregates, such as sand and a courser aggregate, which can be delivered into the bin by the loading conveyor 40. The cement supply bin 18 is of a size to accept a truckload of cement which is blown into the bin 18 through the access mechanism 19.

The machine 10 is equipped with forward and rearward operator stations 81,83, respectively to house the controls and the operator for the respective functions occurring at each end of the machine 10. The operator in the station 81 controls the loading operation of the loading conveyor 40, as well as the loading of cement and water into respective tanks 17,18. The operator in the rearward station 83 controls the delivery of concrete discharged from the mixing auger 35 through the discharge chute 37, as well as monitors the supply of component materials by the delivery conveyor mechanism 20 into the hopper 32 of the mixing mechanism 30 for the proper production of the desired type of concrete.

The concrete production machine 10, as described above, is operable to supply to a continuous production of concrete therefrom for deposit along the path of travel followed by the machine 10. So long as a supply of material is available within the respective bins 14,16,18 and the water tank 17, the delivery mechanism 20 will provide the desired quantities of aggregates and cement into the hopper 32 of the mixing mechanism 30 to be mixed with the water to produce concrete. The tracks 13 permit the machine 10 to be slowly advanced along a path of travel so that a concrete produced in the mixing auger 35 can be deposited rearwardly of the machine 10 within the path of travel in a continuous manner without interruption. One skilled in the art will readily realize that such a concrete production operation is particularly advantageous in situations where concrete is being placed as an overlay, for example on bridges or the like. The use of the loading conveyor 40 can replenish the supply of aggregates in the supply bins 14,16 on an alternating basis as needed to replenish the supply of aggregates therewithin while maintaining a continuous flow of aggregates into the delivery conveyor system 20.

Accordingly, the method of continuously producing concrete and depositing the concrete along a desired path rearwardly of the machine 10 involves a moving of the machine 10 along the path of travel over which the concrete is desired to be deposited, while producing concrete from the component materials stored on the machine 10 and depositing the concrete in the desired location rearwardly of other machine by the pivotally movable mixing auger 35 and discharge chute 37. Simultaneously with the moving of the machine 10 along the path of travel, fresh supplies of aggregates, cement or water, as needed, can be received into the respective supply bins 14,16,17,18 without having to stop the machine 10 to receive and load the fresh materials. The component materials can be withdrawn from their respective bins in desired quantities and at desired flow rates to produce concrete with the desired proportion of materials for discharge through the discharge chute 37 into the desired location.

Because the flow of aggregates from the bins 14,16 are expected to be at a substantially equal rate, the operator in the forward station 81 can receive alternating supplies of aggregates into the receiving hopper 42 and shift the movable section 75 of the delivery portion floor member 43 to form a discharge opening 78,79 over the desired bin 14,16 to maintain segregation of the respective aggregates, as well as a continuous supply thereof into the delivery conveyor mechanism 20. Moreover, because the supply vehicles for cement and water would not utilize the loading conveyor 40, fresh supplies of these materials can be taken on board the machine 10 generally simultaneously with the loading of aggregates into the supply bins 14,16.

It will be understood that changes in the details, materials, steps and arrangement of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A method of continuously producing concrete and depositing said concrete along a desired path comprising the steps of:

moving a mobile concrete producing machine, having a loading conveyor, at least two aggregate supply bins, a cement supply bin, a water tank, delivery conveyors and a mixing auger, along a path of travel substantially corresponding to the desired path along which concrete is to be deposited;

simultaneously with said moving step, receiving supplies of at least two different aggregates delivered from an external ground supported supply vehicle at mutually exclusive intervals by said loading conveyor and conveying said aggregates to preselected respective aggregate supply bins to maintain an adequate supply of each said aggregate in the respective said aggregate supply bin; engaging the supply vehicle with the concrete producing machine to permit propelling the supply vehicle on the ground during said receiving step;

delivering supplies of water and cement to said water tank and said cement supply bin, respectively, simultaneously with said moving step as needed at appropriate intervals to maintain adequate supplies thereof within said mobile concrete producing machine;

withdrawing discernible quantities of each said aggregate and said cement from each said aggregate supply bin and said cement supply bin, respectively, in a substantially continuous manner by said delivery conveyors simultaneously with said moving step and discharging said aggregates and said cement from said delivery conveyors into said mixing auger with preselected quantities of water from said water tank;

mixing said aggregates, cement and water by said mixing auger to produce concrete simultaneously with said moving step; and depositing said concrete from said mixing auger into the desired path of deposit by pivotally moving said mixing auger into a desired position simultaneously with said moving step.

2. The method of claim 1 wherein said moving step is continuous while depositing said concrete along said desired path.

3. The method of claim 2 wherein said receiving step is accomplished in an alternating manner with respect to the different aggregates being delivered to said loading conveyor.

4. The method of claim 3 wherein said delivering step is also simultaneous with said receiving step.

5. The method of claim 3 wherein said moving step is accomplished in a forwardly progressing manner with respect to said path of travel, said depositing step being accomplished generally rearwardly of said mobile concrete producing machine.

6. The method of claim 5 wherein said receiving step is accomplished forwardly of said mobile concrete producing machine.

7. The method of claim 6 wherein said delivering step is simultaneous with said receiving step and said conveying step and is accomplished from respective external sources of supply positioned laterally of said mobile concrete producing machine.

8. The method of claim 7 wherein said cement is blown into said cement supply bin from the respective said external source of supply.

9. The method of claim 7 wherein said withdrawing and discharging step is done in conjunction with a metering mechanism to control the volume of material being discharged into said mixing augers by the respective said delivery conveyors.

* * * * *